United States Patent [19]

Maineult et al.

[11] Patent Number: 5,715,134
[45] Date of Patent: Feb. 3, 1998

[54] SCREENED MEDIUM-VOLTAGE SUBSTATION

[75] Inventors: Jean Maineult, Revonnas; Raymond Pluveau, Sance-Macon; Bernard Joyeux-Bouillon, St-Julien, all of France

[73] Assignee: GEC Alsthom T & D SA, Paris, France

[21] Appl. No.: 736,500

[22] Filed: Oct. 24, 1996

[30] Foreign Application Priority Data

Oct. 26, 1995 [FR] France .................. 95 12 642

[51] Int. Cl.⁶ .......................................... H02B 1/56
[52] U.S. Cl. .......................................... 361/604; 218/157
[58] Field of Search .......................... 218/155–157; 361/602–604, 611, 612, 614

[56] References Cited

U.S. PATENT DOCUMENTS

| | | | |
|---|---|---|---|
| 1,874,808 | 8/1932 | Ruppel | 361/602 |
| 1,920,683 | 8/1933 | Edsall | 361/602 |
| 1,930,156 | 10/1933 | Blomquist | 361/603 |
| 5,003,427 | 3/1991 | Reichl et al. | 361/612 |
| 5,483,417 | 1/1996 | Tanimiza | 361/611 |
| 5,574,624 | 11/1996 | Rennie et al. | 218/157 |

FOREIGN PATENT DOCUMENTS

| | | |
|---|---|---|
| 0224051A1 | 6/1987 | European Pat. Off. . |
| 0291762A2 | 11/1988 | European Pat. Off. . |
| 0311472A1 | 4/1989 | European Pat. Off. . |
| 2259459 | 8/1975 | France . |
| 2351522 | 12/1977 | France . |
| 2620564 | 3/1989 | France . |
| 3519761A1 | 12/1986 | Germany . |
| 3641573A1 | 6/1988 | Germany . |
| 4111586A1 | 10/1992 | Germany . |
| 403922 | 6/1966 | Switzerland . |

*Primary Examiner*—Gregory D. Thompson
*Attorney, Agent, or Firm*—Sughrue, Mion, Zinn, Macpeak & Seas, PLLC

[57] ABSTRACT

A medium-voltage substation includes at least two insulative material chambers each provided with at least one opening for the gas-tight passage of a set of three-phase busbars. Each chamber contains a three-position three-phase switch for connecting the busbars to first gas-tight electrical feed-throughs and for connecting the first feed-throughs to second gas-tight feed-throughs connected to ground. The first feed-throughs of at least one chamber are each electrically connected to a single-phase cable. The first feed-throughs of each chamber are electrically connected either to a fuse or to a pole of a circuit-breaker disposed in an insulative material compartment.

10 Claims, 4 Drawing Sheets

SCREENED MEDIUM-VOLTAGE SUBSTATION

BACKGROUND OF THE INVENTION

1. Field of the Invention

The present invention concerns a medium-voltage electrical power distribution substation.

2. Description of the Prior Art

Substations of this kind including switch-gear, such as a circuit-breaker, in a sealed metal enclosure filled with gas having good dielectric properties are known in themselves. Other substations include a switch-disconnector in a sealed metal enclosure filled with dielectric gas connected in series with fuses in a separate compartment.

In substations of these types replacing a defective unit entails isolating the substation and draining off the insulative gas. These operations are relatively time consuming and the supply of power to the user is interrupted for an unacceptable length of time.

One object of the present invention is to design a substation in which switchgear can be replaced without it being necessary to isolate the substation and preferably without it being necessary to manipulate the gas.

Another object of the invention is to design a substation in which the switchgear can be made at a different place from that at which the substation is assembled, in order to take full advantage of local technical skills.

Another object of the invention is to design a substation that is easy to dismantle at the end of its service life, complying with increasingly severe ecological requirements.

SUMMARY OF THE INVENTION

These objects are achieved by the substation of the invention which includes at least two insulative material chambers filled with a gas having good dielectric properties, each chamber being provided with at least one opening for the gas-tight passage of a set of three-phase busbars, the chambers being disposed side-by-side with their openings in contact to define a single gas-tight interior volume, said chambers each containing a three-position three-phase switch having a first position in which the switch connects each of the busbars to first gas-tight electrical feed-throughs leading to the outside of the chamber, a second position in which the switch connects said first feed-throughs to second gas-tight feed-throughs leading to the outside of the chamber and connected to ground, and a third position in which each of the first feed-throughs is disconnected from the corresponding busbar, the first feed-throughs of at least one chamber being each electrically connected to a single-phase cable, the first feed-throughs of each chamber being electrically connected either to a fuse or to a pole of a circuit-breaker, the fuses and/or circuit-breaker poles being disposed in an insulative material compartment.

According to one feature of the invention, each chamber is made up of two half-chambers bolted together.

According to another feature of the invention, the chambers are disposed in a structure made up of metal plates bent to shape and clipped or riveted together.

According to another feature of the invention, the chambers have a grounded conductive external surface.

The chambers are advantageously fixed to the structure by wedging the two half-chambers between one or more plate members of the framework.

The circuit-breaker is connected or the fuses are connected to a grounding switch disposed in a compartment of the structure under the chamber to which said circuit-breaker is connected or said fuses are connected.

Said compartment containing the grounding switch has a pivoting flap for evacuation of the gas in the event of a fault in the compartment containing the circuit-breaker or the fuses.

The chambers have a rupture area for evacuation of the gas in the event of an internal fault.

The chambers are disposed in a compartment of the structure comprising two horizontal plates, side plates, a front face plate and a back plate.

Some of the plates constituting the compartment containing the chambers incorporate holes for evacuation of the gas in the event of rupture of at least one of the rupture areas.

The invention will be clearly understood from a reading of the following description of a preferred embodiment of the invention with reference to the accompanying drawings.

DETAILED DESCRIPTION OF THE INVENTION

Figure 1:
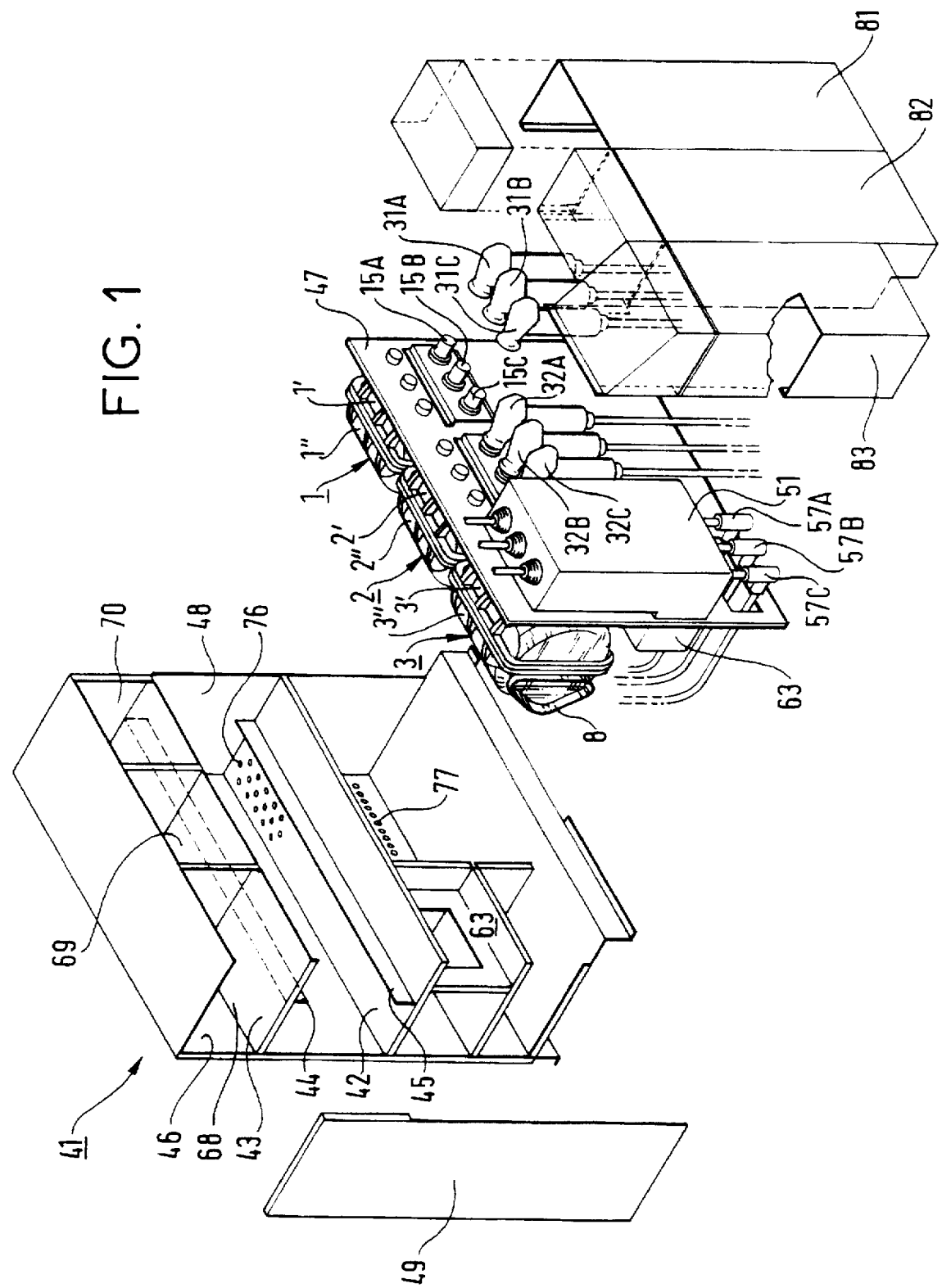
FIG. 1 is an exploded perspective view of a substation including two loop disconnectors and one protection circuit-breaker.
Figure 2:
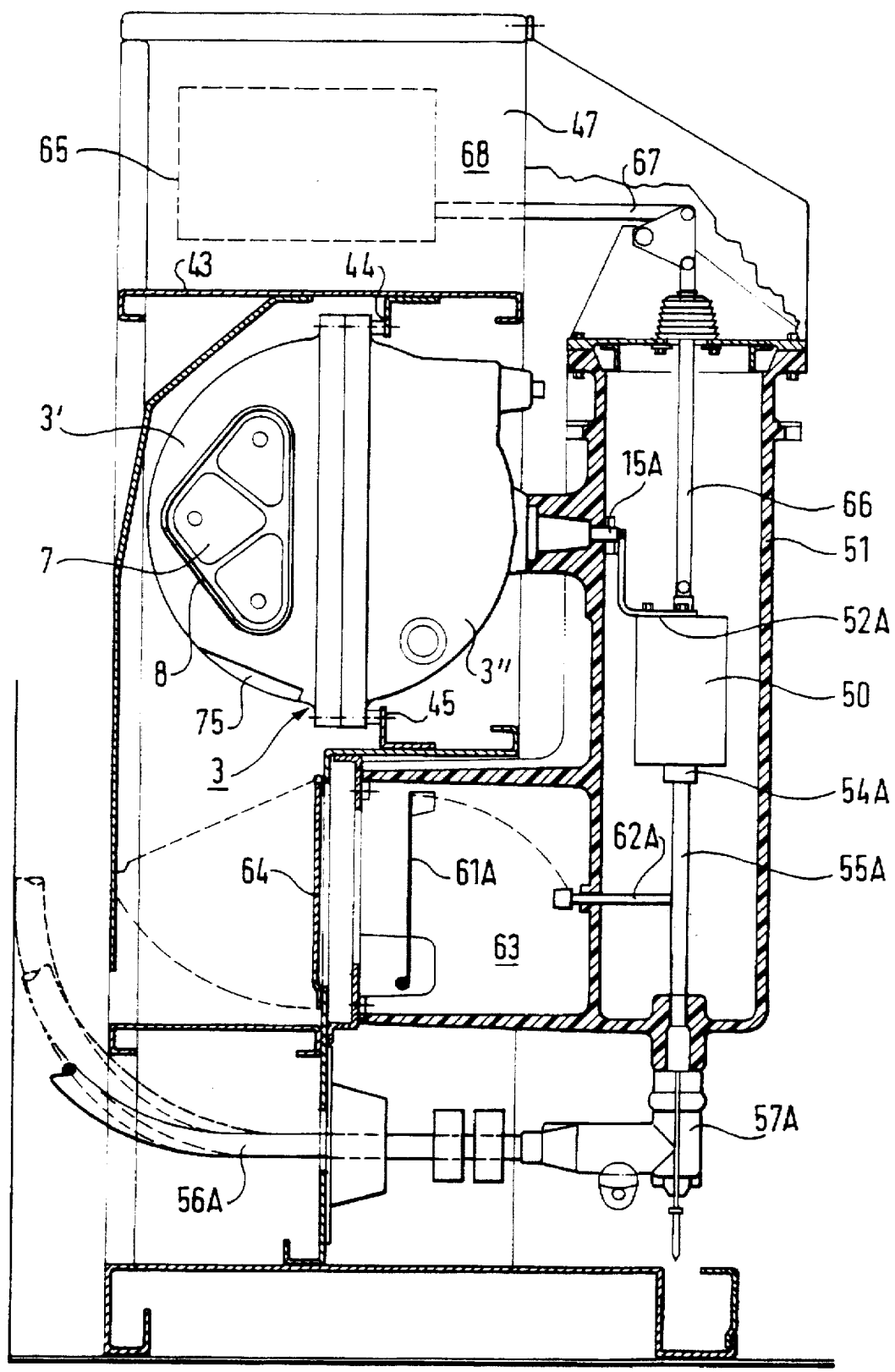
FIG. 2 is an elevation view of the substation from FIG. 1, partly in section.
Figure 3:
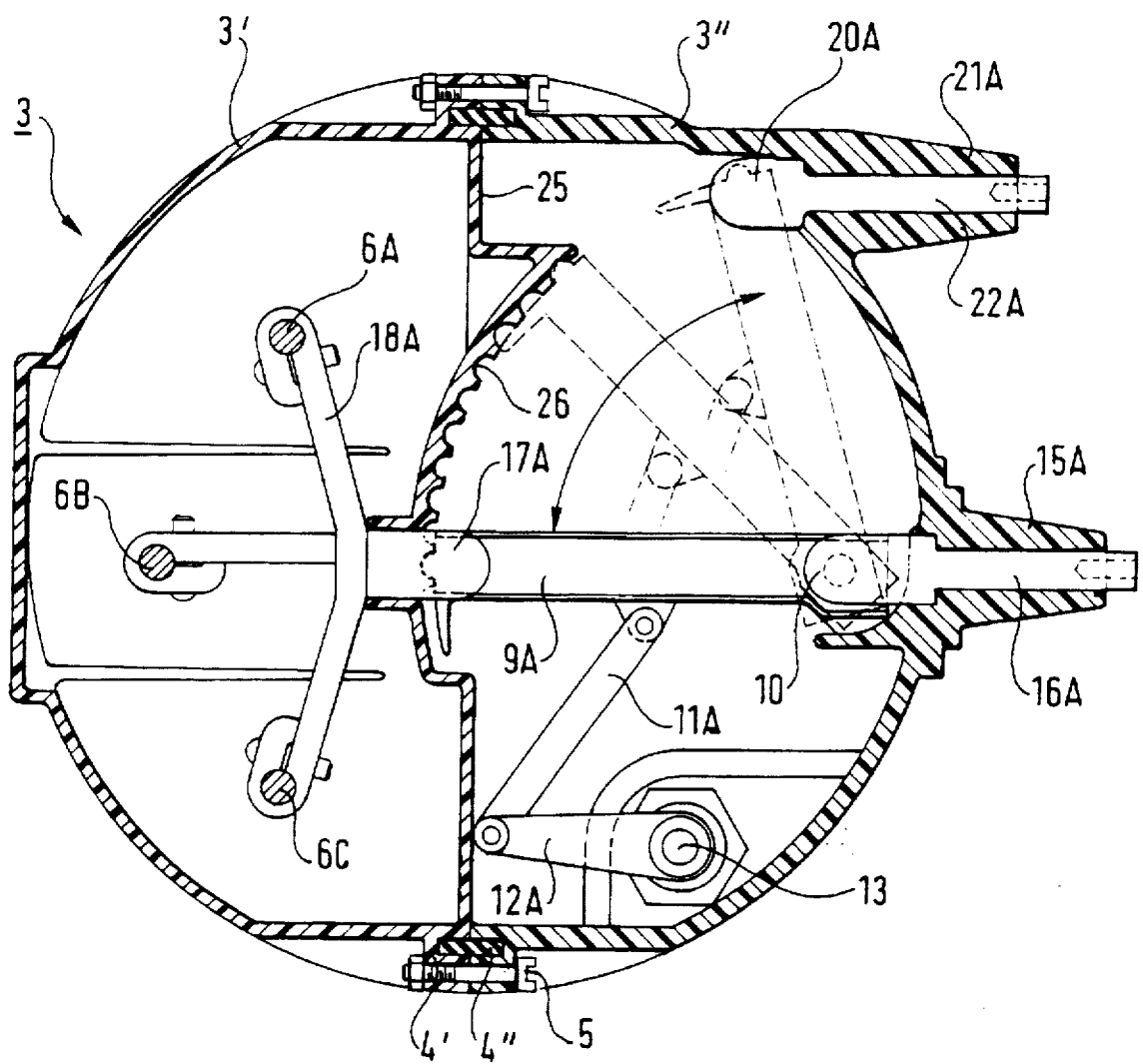
FIG. 3 is a sectional view of a chamber used in the substation of the invention.

FIG. 1 shows three identical chambers 1, 2 and 3 the construction of which is described in detail with reference to FIGS. 2 and 3.

Only the chamber 3 is described in detail; where it is possible to distinguish the components of three-phase systems corresponding to each phase, the distinction is made by means of the letters A, B and C.

The chamber 3 is made up of two half-chambers 3' and 3" made from a thermosetting material or a thermoplastics material. The chamber has a conductive external surface that is grounded to provide an electrical screen and renders the chamber insensitive to atmospheric pollution.

The half-chambers can be assembled together in a gas-tight manner by means of flanges 4' and 4" clamped by nuts and bolts 5, with a gasket (not shown) between them. A chamber has substantially the shape of a cylinder comprising a cylindrical surface delimited by two plane parallel faces.

The chambers are filled with a gas having good dielectric properties, such as sulfur hexafluoride SF6, at a pressure of up to a few bars, but the pressure can be lower if the operating voltage requires this.

The half-chambers 3' contains a set of three-phase busbars 6A, 6B and 6C. These busbars pass through an opening 7 in the wall of the half-chamber 3' and extend inside like half-chambers 2' and 1' of the chambers 2 and 1. To this end the central half-chamber 2' has openings in each of its plane faces and the half-chambers 1' and 3' have one such opening.

The chambers are disposed side-by-side, so that the volume of one chamber communicates with the volume of the adjacent chamber; the openings of the chambers are in contact through gaskets 8 whereby the entire assembly is sealed.

The half-chamber 3" contains a three-position switch comprising three pivoting contact arms with a common insulative shaft 10. Only the arm 9A of phase A can be seen in FIG. 3. What is stated below a propos the arm 9A applies mutatis mutandis to the other arms. The contact arm is maneuvered by means of a linkage including the link 11A and the lever 12A; the lever 12A is articulated to a shaft 13 which passes in a gas-tight manner through the half-chamber 3" and can therefore be maneuvered from outside the half-chamber 3"

At the articulation 10 end, the arm 9A is connected to a first electrical feed-through 15A leading in gastight manner to the exterior of the half-chamber 3". This feed-through has an insulative portion molded in one piece with the half-chamber 3" and an interior conductor 16A adapted to be electrically connected as described below.

The arm 9A cooperates first of all (first position) with a contact 17A connected by a conductor 18A to the busbar 6A; the arm 9A also cooperates (second position) with a contact 20A at the end of a second electrical feed-through 21A having an insulative part molded in one piece with the half-chamber 3" and an interior conductor 22A. The conductor of the second feed-through is adapted to be grounded. The arm 9A can assume an intermediate third position between the first and second positions. In this third position the contact 9A is isolated from the contact 17A and from the contact 20A.

An insulative wall 25 separates the two half-chambers 3' and 3"; during opening and closing, the insulative shaft 10 moves near the insulative wall 25, causing displacement of the dielectric gas and enabling interruption of the current.

The insulative wall 25 incorporates recesses 26 protecting it from damage caused by the electrical arc.

As shown in FIG. 1, the first feed-throughs 15A, 15B and 15C of the chamber 1 are connected to incoming feeder cables via connectors 31A, 31B and 31C.

Similarly, the first feed-throughs of the chamber 2 are connected to cables via connectors 32A, 32B and 32C.

The chambers 1, 2 and 3 are disposed in a metal structure 41 (FIG. 1).

This structure is made from metal plates, cut, bent to shape and riveted or clipped together. This method of manufacture, which excludes welding, is particularly economic and enables easy demounting of the equipment at the end of its service life and easy recovery of re-useable materials.

The half-chambers 1 to 3 are disposed between two parallel horizontal plates 42 and 43 and clamped to plate members 44 and 45 when the half-chambers are assembled together.

The structure includes a plate 46 constituting the rear face of the substation, a front plate 47 with openings for the first and second feed-throughs of the chambers, and side plates 48 and 49.

In the example of substation described here, the chamber 3 is connected to switchgear.

The latter comprises a three-phase vacuum insulated or sulfur hexafluoride SF6 insulated circuit-breaker, for example. Only the pole 50A of the circuit-breaker can be seen in FIG. 2. The circuit-breaker is inside a thermosetting or thermoplastics insulative material tank 51 having a conductive surface and fastened to the backplate 47. The circuit-breaker has a first set of current terminals; of these, the terminal 52A can be seen in FIG. 2, where it can be seen that it is connected to the feed-through 15A of the chambers 3. The circuit-breaker includes a second set of terminals connected by conductors and connectors to outgoing feeder cables. FIG. 2 shows the terminal 54A connected by the conductor 55A to the cable 56A via the connector 57A. The connectors 57B and 57C of the other phases can be seen in FIG. 1.

The circuit-breaker is also connected to a grounding switch. FIG. 2 shows one arm 61A of the grounding switch and the corresponding connecting conductor 62A.

The grounding switch is in a compartment 63 under the half-chamber 3"; the back of this compartment is provided with a pivoting flap 64 which can open in the event of a fault inside the compartment 51 to enable the gas to exit to the rear of the substation.

The circuit-breaker 50 is operated by an operating mechanism 65 via a train of rods 66–67; the operating mechanism, known in itself and not forming any part of the invention, is shown by a dashed outline rectangle. The operating mechanism 65 is in a compartment 68 on top of the chamber 3.

Compartments 69 and 70 adjacent the compartment 68 can accommodate all of the low-voltage equipment that is present in any medium-voltage substation.

Note that the chambers 1 through 3 each include a rupture area 75 which ruptures if the pressure inside the chamber exceeds a predetermined value in the event of a fault.

The gas exits through a series of holes 76 in the plate 42 and holes 77 in the back plate 46.

The substation is completed by covers 81, 82 and 83 protecting the incoming and outgoing cables.

The substation of the invention can be easily adapted in the event of changes to operation of the network. For example, the circuit-breaker in the tank 51 can be replaced by a fuse, the tank 51 becoming a well for the fuses.

Figure 4:
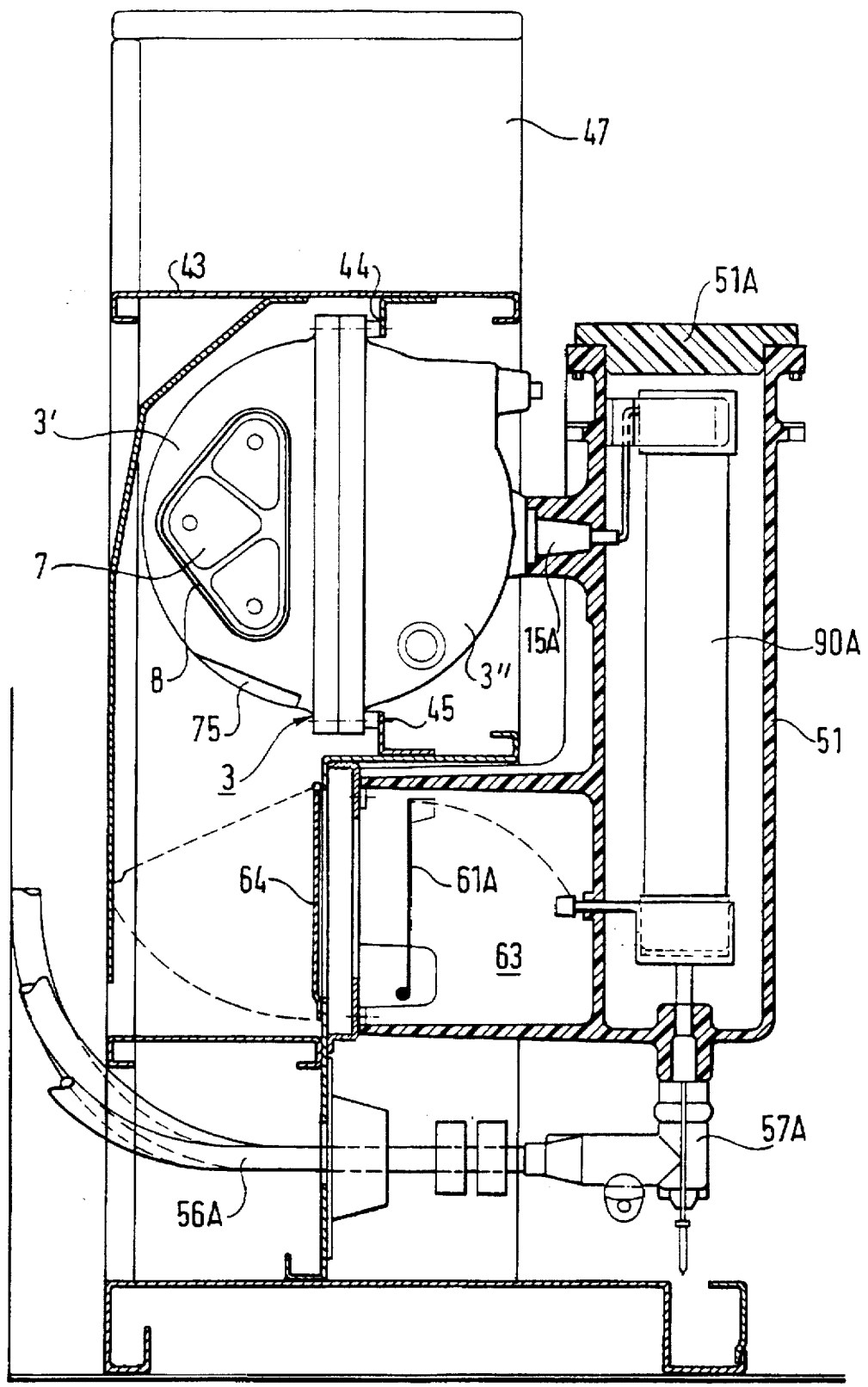
FIG. 4 is a sectional view of a variant substation incorporating fuse protection.

This modification is shown in FIG. 4, which is a partly sectioned view of a substation including two loop outlets and fuse transformer protection.

As already mentioned, the FIG. 4 substation differs from that described with reference to the preceding figures in that the switchgear 50 is replaced by fuses. These are contained in the tank 51, which is closed by a removable cover 51A that is easily removed in order to replace the fuses.

The fuse 90A of phase A can be seen in FIG. 4 and is connected to the output 15A and to the connector 57A.

The substation, two variants of which have just been described, has many advantages:

its construction is simple and economical, it enables separate manufacture of the switchgear, requiring a high degree of quality, and assembly, which can be carried out on site by less skilled labor, it enables some of the switchgear to be replaced live, which improves security of supply, it usually avoids the need to manipulate the gas, which is an obvious ecological advantage, it enables economical recycling at the end of service life, it is capable of rapid modification for easy adaptation to changes in network operation.

The invention is not limited to the examples as described; to the contrary, the design of the substation as described here can be used for substations with air-insulated isolators and SF6-insulated circuit-breakers and substations with all SF6-insulated switchgear, in all possible configurations of use.

There is claimed:

1. A medium-voltage substation including at leash two insulative material chambers filled with a gas having good dielectric properties, each chamber being provided with at least one opening for the gas-tight passage of a set of three-phase busbars, said chambers being disposed side-by-side with their openings in contact to define a single gas-tight interior volume, said chambers each containing a three-position three-phase switch having a first position in which said switch connects each of said busbars to first gas-tight electrical feed-throughs leading to the outside of said chamber, a second position in which said switch connects said first feed-throughs to second gas-tight feed-throughs leading to the outside of said chamber and connected to ground, and a third position in which each of said first feed-throughs is disconnected from the corresponding busbar, said first feed-throughs of at least one chamber being each electrically connected to a single-phase cable, said first feed-throughs of each chamber being electrically connected either to a fuse or to a pole of a circuit-breaker, said fuses and/or circuit-breaker poles being disposed in an insulative material compartment.

2. The substation claimed in claim 1 wherein each chamber is made up of two half-chambers bolted together.

3. The substation claimed in claim 2 wherein said chambers are disposed in a structure made up of metal planes bent to shape and clipped or riveted together.

4. The substation claimed in claim 3 wherein said chambers are fixed to said structure by wedging said two half-chambers between one or more plate members of said framework.

5. The substation claimed in claim 1 wherein said chambers have a grounded conductive external surface.

6. The substation claimed in claim 1 wherein said circuit-breaker is connected or said fuses are connected to a grounding switch disposed in a compartment of said structure under said chamber to which said circuit-breaker is connected or said fuses are connected.

7. The substation claimed in claim 6 wherein said compartment containing said grounding switch has a pivoting flap for evacuation of said gas in the event of a fault in said compartment containing said circuitbreaker or said fuses.

8. The substation claimed in claim 1 wherein said chambers have a rupture area for evacuation of said gas in the event of an internal fault.

9. The substation claimed in claim 3 wherein said chambers are disposed in a compartment of said structure comprising two horizontal plates, side plates, a front face plate and a back plate.

10. The substation claimed in claim 9 wherein some of said plates constituting said compartment containing said chambers incorporate holes for evacuation of said gas in the event of rupture of at least one of said rupture areas.

* * * * *